March 7, 1944. M. P. DOUGHERTY 2,343,755
CONDUIT COUPLING DEVICE
Filed April 2, 1942
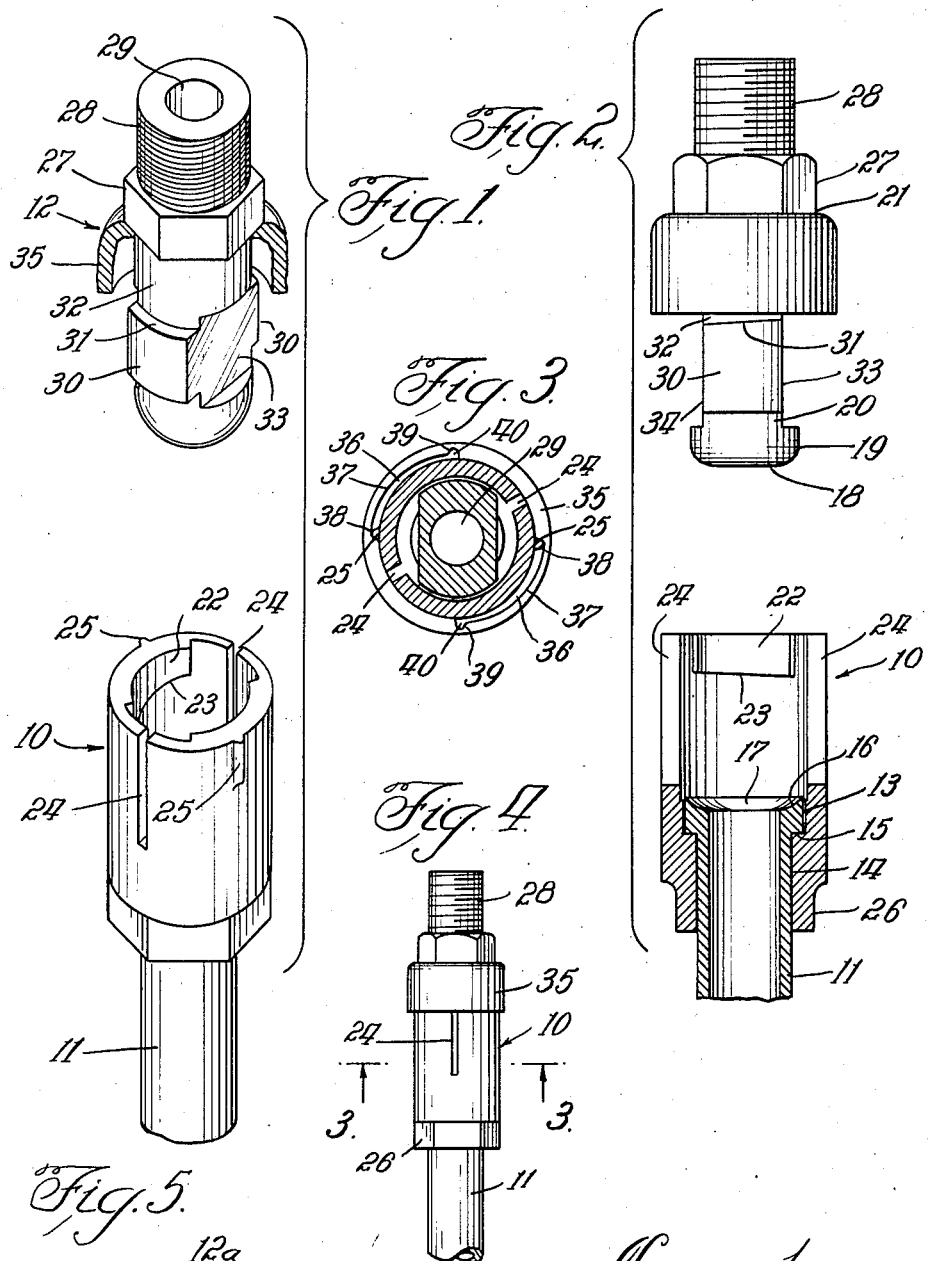
Inventor:
Martinello Patrick Dougherty
By-
Att'y.

Patented Mar. 7, 1944

2,343,755

UNITED STATES PATENT OFFICE 2,343,755

CONDUIT COUPLING DEVICE

Martinello Patrick Dougherty, Marysville, Kans.

Application April 2, 1942, Serial No. 437,327

6 Claims. (Cl. 285—191)

This invention has to do with conduit couplings and more particularly relates to an improved coupling device that is easily and inexpensively produced, expediently installed, conveniently detached to demobilize an installation, durable, and dependably effective in service.

An important object of the invention is the provision of a novel coupling device including complemental parts capable of telescopic assembly while respectively associated with conduits or the like that are to be communicatively connected thereby, of which parts one has a seat for a seatable portion of its associated conduit and of which parts the other has an axially bored boss disposed communicatively between said conduits and coaxially of and in abutting relation with said seatable conduit portion to press it firmly in said seat when the parts are assembled.

An additional object of this invention is the provision of complemental conduit coupling parts that are telescoped when assembled, and of which the outer part has means adjacently to an end for engaging a portion of the inner part to prevent relative lateral displacement of said parts and which also has seating means spaced from said engaging means a substantial distance axially toward its opposite end and in seating relation with an axially bored boss of the inner part to thus provide for the inner part a sealed communicative connection through a passage in said seat with a conduit associated with the outer part and also to provide resistance to relative lateral displacement of said parts.

A further object is the provision of a coupling device according to the next preceding object wherein the complemental parts are relatively rotatable to establish a firm seated relation of the inner part boss within said seat and wherein the seat is adapted to be formed upon a conduit end portion disposed coaxially within and relatively rotatable with respect to the outer part to minimize torsional strain upon the conduit pursuant to the aforesaid relative rotation of the coupling parts in effecting installation of the device.

A further object is the provision of an improved quickly installable conduit coupling device in which there are sets of cam studs respectively upon complemental parts to move the parts relatively axially into assembly when they are relatively rotated, together with an improved detent means for releasably maintaining the parts relatively rotated.

Still a further object of this invention is the provision of a conduit coupling device in which the inner of a pair of telescopically associatable parts is provided with a guard skirt for and in support of detent means that releasably maintains the parts in relatively rotated assembly.

These and other desirable objects encompassed by and inherent to the invention will be better understood from the appended claims and the ensuing description together with the annexed drawing, wherein:

Fig. 1 is an exploded view of a coupling device constructed according to the principles of the present invention, illustrating in perspective a barrel counterpart and a head counterpart adapted for telescopic assembly, a portion of the head being broken away for clarity;

Fig. 2 is also an exploded view showing the same parts as are illustrated in Fig. 1 but wherein the head member is shown in side elevation and the barrel member is shown in axial cross section;

Fig. 3 is a transverse sectional view taken substantially upon the line 3—3 of Fig. 4;

Fig. 4 is a side elevational view of the device shown in the assembled condition; and Fig. 5 is a fragmentary view taken in side elevation illustrating a modified form of detent structure for releasably maintaining the head and barrel counterparts of a coupling device in relatively rotated assembly.

Referring now to the drawing and particularly to Figs. 1 and 2 the present preferred form of the invention will be seen to constitute a device having a barrel counterpart 10 associatable with a conduit 11 and a head counterpart 12 associatable with another conduit or the like (not shown) and telescopically associatable with the barrel 10 for connecting the conduits, of which the conduit 11 is shown, in sealed intercommunicative relation.

Examining the barrel 10 in detail, it is seen to contain an axial passage 13 of smaller diameter at a portion 14 adjacently to its lower end to effect a shoulder 15 upon which a seating means in the form of a flanged head 16 upon the upper end of the conduit 11 is adapted to rest. Said conduit is associated with the barrel 10 by inserting it endwise downwardly through the passage 13 to bring the flanged head 16 into abutting relation with the shoulder 15 in the manner shown in Fig. 2. It will also be noted in Fig. 2 that the upper end of the seating means effected by the flanged head 16 is formed with a concave surface portion 17 conforming to a convex surface portion 18 upon the tip 19 of a boss 20 projecting axially from the main body part 21 of the head 12. The cooperation of the convex surface 18 and the concave surface 17 will be explained presently.

The barrel 10 is also provided adjacently to its upper end with a set of diametrically opposite cam studs 22 projecting radially inwardly of the barrel and having inclined camming faces 23 along their innermost edges, that is, the edges presented downwardly in Figs. 1 and 2. Said barrel is also axially split by virtue of diametrically opposite axially directed notches 24 to permit deformation of the barrel to modify its circumferential and radial extent. The barrel is made of resilient material such as tempered steel or brass or suitable alloy so that it will have a tendency to recover to the relaxed condition illustrated in Figs. 1 and 2 following a modification in its diameter as permitted by the axial slits 24. Detent means for releasably maintaining the head 12 and barrel 10 in a relatively rotated assembled condition, as will be explained presently, includes a pair of axial studs 25 upon the outer cylindrical periphery of the barrel 10. A polygonal portion 26 adjacently to the lower end of the barrel counterpart provides a plurality of facets adapted to be engaged by a wrench to facilitate assembly of the device.

Referring now to the head 12 as illustrated in Figs. 1 and 2 the main body portion 21 is seen to have a polygonal section 27 providing wrench facets. A threaded section 28 above the polygonal section 27 facilitates attachment of a conduit (not shown), container, or the like communicatively with a bore 29 extending axially completely through the head. The aforesaid boss 20 constituting the lower portion of the head is provided with a pair of diametrically opposite cam studs 30 having camming faces 31 upon their upper ends. These cam studs 30 are formed by cutting away the material of the head both above and below the axial portion of the head occupied by said studs 30 in effecting a neck portion 32 and the tip 19. Thereafter diametrically opposite faces 33 and 34 are formed as by a planing operation to leave the projecting parts of the head forming the studs 30.

There is also formed integrally with the head 12 a skirt portion 35 arranged circumferentially about and in spaced relation with the neck portion 32. Said skirt may, of course, be formed separately from the remainder of the head and connected therewith by any standard means. In Fig. 3 the inner periphery of the skirt 35 can be seen to have diametrically opposite notches 36 with circumferentially extending cam surfaces 37 which have greater radial displacement with respect to the head axis at an insertion end 38 than at their opposite or detent end 39 wherein there is an axial detent notch 40 and which are respectively adapted to receive the detent studs 25 upon the barrel 10. Before installing the device in coupling relation between a pair of conduits or the like, the barrel 10, in the form of the invention herein illustrated, will first be associated with its respective conduit 11 by the insertion of such conduit axially downwardly through the barrel bore 13 to bring the seating means or head 16 onto the shoulder 15. The head member 12 may at this time be in threaded attachment or connection with a second conduit, container, or the like (not shown) by means of the threaded section 28 and in communicative relation with such conduit or container through the axial duct 29. It will be seen, therefore, that in some installations the head 12 may be anchored to a conduit or vessel that is non-rotative about the axis of said head whereby the head will be rotatively fixed. Contrarily, the barrel 10 and a conduit as 11 will be relatively rotatively associated.

The parts 10 and 12 will be telescoped together subsequent to axially aligning the cam studs 22 with the spaces between the circumferentially spaced cam studs 30, thus passing the sets of studs 22 and 30 axially past one another and bringing the tip end 19 of the head 12 into contiguity with the seating means 16 upon the upper end of the conduit 11. During this telescoping of the parts 10 and 12 the relative rotated position of these parts will be that illustrated in Fig. 3 whereby the detent studs 25 are in axial registry with the ends 38 of the circumferential camming surfaces 37 within the inner periphery of the skirt 35. The studs 25 are readily inserted into the skirt at such ends of the camming surfaces 37. The thus telescoped parts 10 and 12 are then relatively rotated to carry the cam faces 23 and 31 slidingly together whereby slight relative axial movement of said parts 10 and 12 is effected, pressing the tip 19 firmly into the seat 16 and thus effecting a sealed connection between the tip and seat inasmuch as the convex surface portion 18 conforms to the concave surface portion 17. During this relative rotation of the parts 10 and 12 the detent studs 25 will bear against the arcuate cam surfaces 37, causing slight contraction of the slit upper part of the barrel, and at the conclusion of such relative rotative movement the studs 25 arrive in circumferential registry with the detent notches 40 whereupon the resilient barrel springs to the relaxed condition incident to projecting the studs 25 into said notches 40 and thus yieldingly or releasably maintaining the parts 10 and 12 in their relative rotative position.

The aforesaid relative rotation of the parts 10 and 12 is accomplished by means of wrenches respectively associated with the polygonal portions 26 and 27. Disassembly of the device is accomplished by relative rotation in the opposite direction by means of similarly applied wrenches.

Following assembly of the device it will have the appearance as illustrated in Fig. 4, and here it will be seen that the skirt 35 in addition to providing one component of the detent means, namely, the notches 40, also serves as a guard for the upper end of the barrel 10 and as a shield for the device from objects or the like which might otherwise incur sufficient force upon the barrel for withdrawing the detent studs 25 from the notches 40, rendering the detent means ineffective and making the device vulnerable to becoming loosened by vibrations to which it might be subjected while in use on certain kinds of installations.

While I prefer to provide the seat 16 for the boss tip upon an end of a conduit as 11, the invention contemplates a structure in which such seat is formed independently of the conduit and either integral with the barrel 10 or made separately therefrom and disposed therein to rest upon a shoulder as 15. When the latter structure is employed the conduit as 11 may be connected with the part 10 as by a threaded connection employing a threaded section as that at 28 upon the head 12.

The modification shown in Fig. 5 differs from the device shown in the lower numbered figures only insofar as there is provided, upon the head 12a, a circumscribing flange 60 in lieu of the skirt 35. This flange 60 is provided with a plurality of pairs of radial slits 61, of which only one pair is shown, for forming laterally deflectable resilient detent tongues 62 therebetween. Each tongue has a downwardly facing detent stud 63 cooperable with a mated detent notch 64 in the upper end of the barrel 10a. As said end of the barrel approaches the flange 60 during relative rotation of the parts 10a and 12a (in the direction indicated by the arrows) for effecting a connection between conduits, the studs 63 will be pressed upon by said barrel end to displace the resilient tongues 62 into the dotted line position, and upon completion of the relative rotation the notches 64 arrive in registry with their respective studs 63 whereupon the tongues snap to the full line position placing the detent studs in their mated detent notches. In this modification the barrel 10a need have no axial slits as the slits 24 in the first embodiment.

Although I have herein shown and described but a limited number of preferred embodiments, it should be understood that the invention extends to numerous other forms, modifications, structures and combinations of parts falling within the spirit and scope thereof and not sacrificing all of its material advantages.

I claim:

1. A conduit coupling device comprising a barrel having an axial duct and including cam means within said duct, a head member having an axial duct communicative with an end thereof and attachable to said barrel with said end of the head projected endwise through an end portion of said barrel into the barrel duct, said head member including cam means projectable into the barrel with said head end where the last named cam means is cooperable with the cam means in the barrel to draw said head and barrel axially into coassembly pursuant to relative rotation thereof, said head also including holding means having an inner periphery arranged circumferentially about and in radial spaced relation therewith to embrace an outer periphery of said end portion of the barrel when the head end is projected into the barrel duct as aforesaid, said end portion of the barrel and said holding means being relatively displaceable radially from an initial radial position incident to creating in one thereof a biasing force tending to restore such initial position, circumferentially directed cam means on one of said peripheries and having circumferentially spaced termini, and detent means comprising a component in the form of a notch at the rise terminal and a component projecting radially from the other of said peripheries into registry with the fall terminal prior to said relative rotation of said head and barrel, and said projecting detent component being cooperable with said cam means to effect said radial displacement of said barrel end portion and holding means to create said biasing force while riding on said cam means toward said rise terminal during such relative rotation, and being projectable by said biasing force into said notch component following traversal of said cam means and arrival in registry with said notch.

2. A conduit coupling device comprising a barrel having an axial duct and including cam means within said duct, a head member having an axial duct communicative with an end thereof and attachable to said barrel with said head end projected endwise through an end portion of the barrel into the barrel duct, said head member including cam means also projected into the barrel and cooperable with the barrel cam means to draw the head and barrel axially into coassembly pursuant to relative rotation thereof when the head portion is projected into the barrel duct, said head also including holding means in the form of a skirt having an inner periphery disposed in radial spaced relation therewith to embrace said barrel end portion when the head end is projected into the barrel duct, a circumferentially directed cam on the skirt inner periphery and having rise and fall termini, and detent means comprising components respectively in the form of a notch at the rise terminal of the cam and a stud upon the outer periphery of the barrel end portion in such circumferential position as to register with the fall terminal of the cam prior to said relative rotation of the head and barrel, said barrel end portion being axially split to permit radial inward displacement thereof from an initial radial position incident to creating therein a biasing force tending to reestablish the initial position, said detent stud being operable to traverse said cam toward its rise terminal during said relative rotation and thus react thereon to so displace the barrel end portion, said detent stud arriving in registry with the detent notch upon completion of said relative rotation of the head and barrel, and said biasing force created in the barrel end portion being effective to project said detent stud into the detent notch upon the establishment of such registry.

3. A conduit coupling device comprising a barrel having an axial duct and a seat therein coaxial with said duct, said seat being spaced axially from an end portion of the barrel and facing toward such end portion, cam means in said barrel between said seat and the barrel end at said end portion, a head member also having an axial duct communicating with an end thereof and including an axially extending boss having a tip constituting said head end, said head also including cam means substantially upon the root of said boss and being associatable with said barrel with the boss projected axially inwardly through the barrel end portion, with the boss tip in contiguity with said seat and with the cam means of the barrel and head in cooperative relation to draw the head and barrel axially into coassembly with the boss tip pressed firmly in said seat pursuant to relative rotation of the head and barrel, guard means circumscribing said head at such an axial position thereon that said guard means is in juxtaposed protecting relation with said barrel upon the establishment of such coassembly, and detent means comprising counterparts respectively associated with said guard means and said barrel end portion and so disposed circumferentially of the device as to arrive in complemental registry to resist relative rotation of the barrel and head, upon the execution of said relative rotation.

4. A two-member conduit coupling comprising a tubular female member with an interior seat at one end, a male member of a size adapted to enter axially the open end of the female member, a lug on the outer surface of the male member, a channel capable of passing said lug along the inner wall of the female member parallel to the latter's axis, a cam shoulder extending from said channel along the interior wall of the female member commencing at a point slightly less distant from the interior seat than the distance between the entering tip of the male member and the lug thereon, and locking means on the outside surfaces of the female member engageable with complementary locking means on the male member.

5. A two-member conduit coupling comprising a tubular female member with an interior seat at one end, a male member of a size adapted to enter axially the open end of the female member, a lug on the outer surface of the male member, a channel capable of passing said lug along the inner wall of the female member parallel to the latter's axis, a cam shoulder extending from said channel along the interior wall of the female member commencing at a point slightly less distant from the interior seat than the distance between the entering tip of the male member and the lug thereon, a detent on the outside surface of the female member near its open end, and a locking means on the male member extending outwardly and over the outside of the female member into engageable relationship with said detent means, whereby seating the male member on the interior seat of the female member and turning the male member through a short arc, the locking means on the male member will engage the detent means on the female member and hold the two members tightly together.

6. A two-member conduit coupling comprising a tubular female member with an interior seat at one end, a male member of a size adapted to enter axially the open end of the female member, a lug on the outer surface of the male member, a channel capable of passing said lug along the inner wall of the female member parallel to the latter's axis, a cam shoulder extending from said channel along the interior wall of the female member commencing at a point slightly less distant from the interior seat than the distance between the entering tip of the male member and the lug thereon, a detent means extending outwardly from the open end of the female member, and a locking means on the male member engageable with said detent means, said detent means being so positioned with respect to the cam shoulder that seating the male member on the interior seat of the female member and turning the male member through a short arc will draw the two members tightly together and lock them in closed position.

MARTINELLO PATRICK DOUGHERTY.